Dec. 27, 1966
R. H. DUNHAM
3,294,392
VACUUM CHUCKING
Filed May 31, 1963
FIG. 1
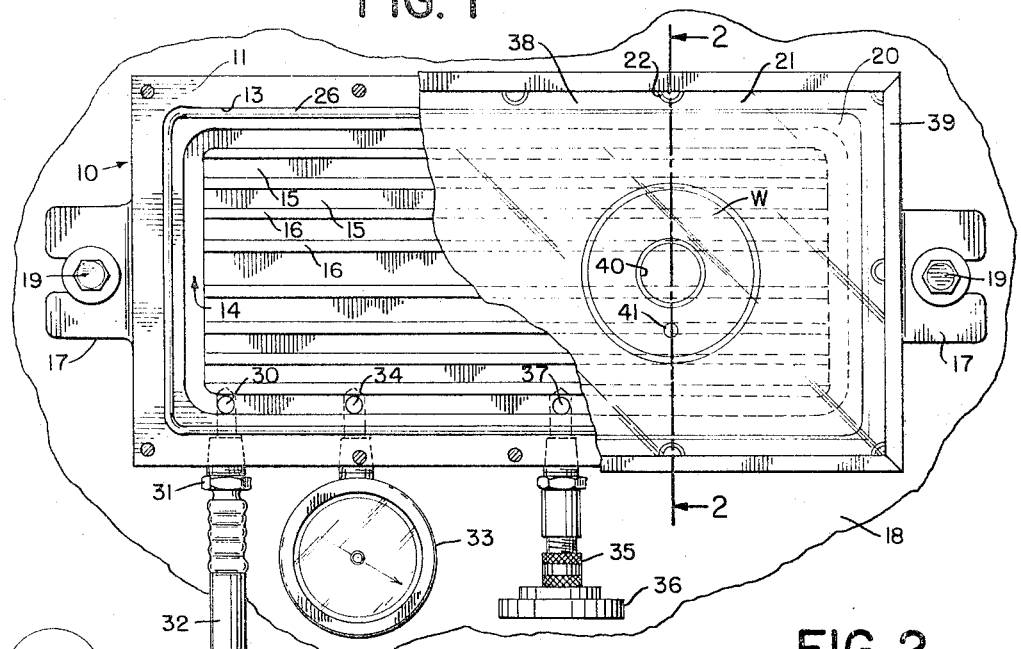
FIG. 2
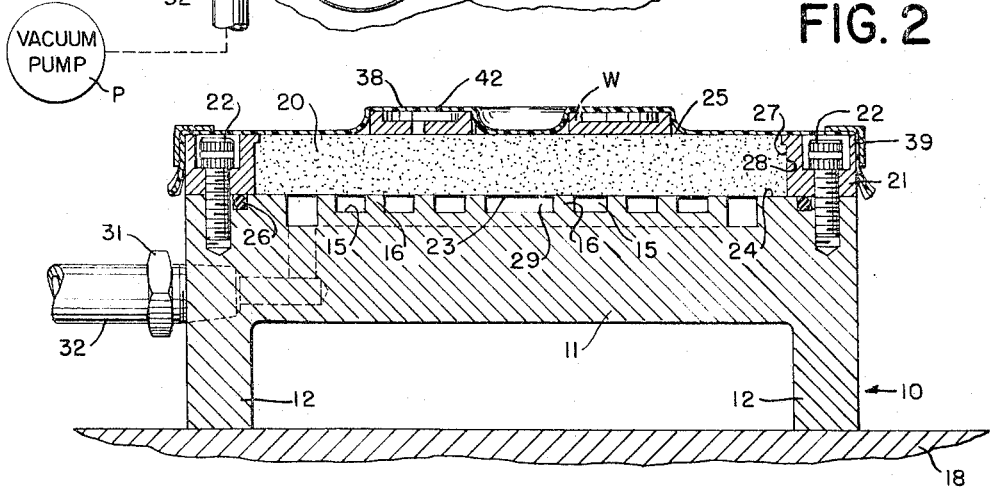
FIG. 3
INVENTOR.
RUSSELL H. DUNHAM
BY *Mandeville & Schweitzer*
ATTORNEYS United States Patent Office 3,294,392
Patented Dec. 27, 1966

3,294,392
VACUUM CHUCKING
Russell H. Dunham, New Fairfield, Conn., assignor to The Dunham Tool Company, Inc., New Fairfield, Conn., a corporation of Connecticut
Filed May 31, 1963, Ser. No. 284,615
1 Claim. (Cl. 269—21)

This application is a continuation-in-part of copending application Serial No. 254,085, filed January 28, 1963, now U.S. Patent No. 3,233,887.

The present invention relates to workpiece holding devices and methods, and, more particularly, to new and improved method and apparatus for vacuum chucking.

Heretofore, it has been conventional in the art to hold flat ferrous workpieces in magnetic chucks for layout, milling, flycutting, planing, surface grinding, and like operations. However, the holding of similarly shaped, nonferrous workpieces for the same operations has been extremely difficult and in many cases impossible using conventional fixtures and holding mechanisms. Accordingly, it has been proposed to utilize vacuum-actuated chucks for holding nonferrous, and even many ferrous workpieces. However, vacuum-actuated chucks have not, heretofore, achieved widespread acceptance because of the generally limited applicability and usefulness of vacuum chucks of known design and the resulting high cost and inconvenience of providing vacuum chucking facilities for a wide range of workpieces.

The new and improved vacuum chuck of the present invention enables a wide range of parts, made from such nonferrous materials as carbon, aluminum, glass and plastic, to be securely and tenaciously held during flycutting, milling, surface grinding and planing operations. Specifically, the vacuum chuck of the present invention comprises a housing having predetermined vacuum channels, and a flat, porous chuck block fixed to the housing by a rigid frame. The housing also includes an exhaust passage for withdrawing air from the vacuum chamber and the chuck block to create the necessary vacuum, a pressure gage to measure and indicate that vacuum, and a release valve to admit air into the vacuum chamber to destroy the vacuum and release a held workpiece from the porous chuck block.

In accordance with one important aspect of the invention, a vacuum is created over the entire working area of the chuck block, so that its entire upper surface may be used to draw and to hold a workpiece thereagainst. In this manner, vacuum-created, hold-down forces, whose chucking effect is similar to the magnetically-created, hold-down forces heretofore obtainable with magnetic chucks, are made available for tenaciously holding nonferrous workpieces in a fashion previously achieved only by magnetic devices with ferrous materials.

In accordance with a particularly important aspect of the present invention, relatively great hold-down forces may be applied to a workpiece by blanketing both the workpiece and the porous chuck surface with a sheet of thin plastic film. The plastic film blanket, being nonporous, tends to seal the workpiece against the chuck and to increase the hold-down efficiency of the generated vacuum. Moreover, some of the hold-down forces acting on the film are transmitted to the workpiece and supplement the holding effect of the vacuum acting directly on the workpiece.

For greater and more complete understanding of the nature of the present invention, reference should be made to the following detailed description taken in conjunction with the accompanying drawings, in which:

FIG. 1 is a plan view of a vacuum chuck with a porous chuck block and film-blanketed workpiece held thereon in accordance with the principles of the present invention;

FIG. 2 is a cross-sectional view of the mechanism of FIG. 1 taken along line 2—2 thereof; and FIG. 3 is a partial cross-sectional view of the blanketed part of FIG. 2 after having been subjected to a machining operation.

With reference to FIGS. 1 and 2 of the drawings, reference numeral 10 generally designates a vacuum chuck housing or base, advantageously of cast construction, which includes an upper wall 11 supported by integral housing walls 12. An endless, upwardly opening sealing groove 13 is formed in the machined upper surface of the upper wall 11, and is advantageously spaced slightly inwardly of the edge extremities of the base. Within the outline of the circumscribing sealing groove 13, the upper wall 11 has formed therein a network 14 of interconnected vacuum canals 15 which themselves define a series of support bars 16 forming part of the machined upper surface of the base 10. Advantageously, a pair of mounting lugs 17 extend from the housing 10 to allow the vacuum chuck housing to be securely bolted to a surface 18, such as, for example, the table of a milling machine or surface grinder, by a pair of mounting bolts 19.

A rectangular, porous chuck block 20, advantageously fabricated from porous stainless steel, is secured to the upper wall 11 of the vacuum chuck housing 10 and against the support bars 16 by a rectangular flanged frame 21 and a series of bolts 22 disposed about the periphery of the frame, advantageously outside of the sealing groove 13. In accordance with the invention, the closure between the bottom surface 23 of the chuck block 20 and the upper surface 24 of the housing 10 is made vacuum tight by an O-ring 26 positioned in the sealing groove 13 and having an initial condition in which the top of the O-ring projects well above the surface of the base. The O-ring 26 is compressed into tight-sealing relation with the base and the frame 21, when the bolts 22 are tightened down. A tight seal is also obtained between inner surfaces 27 of the frame 21 and side walls 28 of the chuck block when the bolts 22 are tightened. Thus, the chuck block 20 is exposed to the ambient room pressure only at its upper chucking surface 25.

As will be understood, the vacuum canals 14 and the bottom surface 23 of the chuck block 20 cooperate to form a vacuum chamber 29 of predetermined configuration, advantageously including an enclosing outer passage and a plurality of transverse connecting passages.

An exhaust passage 30 communicates between the vacuum canal network 14 and an external fitting 31 which is adapted to be connected to a vacuum pump P (illustrated schematically) by appropriate means, such as a tube 32. As shown in FIG. 1, a vacuum pressure gage 33 is mounted in a housing wall and communicates through a reference passage 34 with the vacuum canal network 14. Similarly, an adjustable release valve 35 having a control handle 36 is also mounted in a housing wall 12 and communicates with the vacuum canal network 14 through a release passage 37. Advantageously, the reference passage, exhaust passage, and release passage are parallel and terminate in the same general area of the housing 10 to facilitate both the manufacture and subsequent operation of the new vacuum chuck mechanism.

In the operation of the chuck mechanism of the present invention, a workpiece W is placed on the upper surface 25 of the porous chuck block 20 in the position in which it is to be held. The workpiece W and the entire chucking surface 25 of the block 20 are draped with a film of plastic material 38, having a thickness in the range of .0005 to .0040 inch. A thin vinylidene chloride film, available commercially under the trademark "Saran" has been found to be especially well-suited for the practice of the present invention. As shown in FIG. 2, a rectangular film frame 39 having dimensions slightly greater than those of the housing 10 may be placed over the film-blanketed chuck block 20 to hold the plastic film 38 in place and in an enveloping relation with the chucking surface 25 of the chuck block.

The workpiece W may then be chucked securely in place by evacuating the vacuum chamber 29 by means of the vacuum pump P to reduce the absolute pressure in the chamber 29 and in the chuck block 20, itself, to a pressure below atmospheric, for example, 22″ Hg, at which pressure the workpiece W and the film 38 will be firmly drawn to the upper surface 25 of the chuck block. A measurement of the specific vacuum developed in the chamber and chuck block may be obtained from the pressure gage 33 which communicates therewith. For the handling of delicate parts, the vacuum level may be reduced by adjusting the release valve 35 for a predetermined, controlled leakage of air into the interior of the vacuum chamber 29. Typically, a small, one-third horse power vacuum pump will develop a holding power of approximately 12 pounds per square inch of chuck block surface.

As shown in FIG. 1, the part W has a central bore 40 and a small aperture 41 therein. When the film 38 is draped thereover, the vacuum in the chuck block causes the film to be drawn toward the upper surface of the chuck block into intimate contact therewith (FIG. 2). As will be understood, the film 38 completely seals off the vacuum chamber and chuck block from the atmosphere, and immediately increases the vacuum therein, since the pump will no longer be drawing air through the upper surface 25 of the chuck.

In accordance with the principles of the invention, the vacuum pressure acting against underside of the workpiece W provides the primary hold-down forces for the workpiece. For example, a one inch square workpiece will be held down by primary forces of approximately 12 pounds, attributable directly to the vacuum in the chamber 29. However, these primary hold-down forces are supplemented by secondary hold-down forces exerted by the film itself. Specifically, with the plastic film spanning the workpiece and sealing its outer edges, the vacuum hold-down forces acting on the film, itself, are transmitted to the workpiece in the nature of secondary hold-down forces, and, thus, the secondary hold-down forces actually supplement the primary hold-down forces.

When the top surface 42 of the workpiece W is machined or ground, the plastic film covering that surface is removed by the initial cut. However, the vacuum in the chuck block 20 is not at all diminished, and, as shown in FIG. 3, it causes the remaining film 38′ to be drawn into ever closer contact with the workpiece to seal tightly from the atmosphere the bore and aperture thereof. Moreover, in its attempt to closely conform to the workpiece and the chuck block surface, the plastic film tends to hold the workpiece stationarily on the chuck block 20 to resist any tendency of the workpiece to slide under the influence of the forces of a machining operation.

After the desired machining operation has been completed, the workpiece may be quickly and simply released from the upper surface 25 of the chuck block 20 by destroying the vacuum therein. This is accomplished by admitting air at atmospheric pressure into the chamber by opening the release valve 35. When the pressure in the vacuum chamber 29 and the porous chuck block 20 is substantially equal to atmospheric pressure, the workpiece and the film may be removed from the chuck.

It will be appreciated that the vacuum chucking method and apparatus disclosed herein, provide a new and improved means of chucking non-ferrous workpieces in a manner that was heretofore available only for ferrous workpieces and only by magnetic means. Moreover, since the porous chuck block and blanketing plastic film of the present invention accomplish the reliable and efficient chucking of both ferrous and non-ferrous workpieces of any shape, for surface grinding, flycutting, and like machining operations, a new degree of universality is achieved, which is greater than that attainable heretofore with either vacuum actuated or magnetic chucks.

Although the present invention has been described with reference to a specific, preferred embodiment, it should be understood that the disclosure has been made only by way of example, and that certain changes in details of construction and arrangement of elements may be made without departing from the spirit and scope of the invention as hereinafter claimed.

I claim:

A method of chucking a workpiece to a continuous, porous planar surface of a closed vacuum chamber with a non-porous sheet material, comprising the steps of
(a) supporting said workpiece on said porous surface,
(b) completely covering said workpiece and said surface with an integral sheet of non-porous material to seal said porous surface from the ambient atmospheric pressure, the pressures of the vacuum in said chamber thereby drawing said workpiece and said sheet toward said surface to hold them thereagainst,
(c) thereafter selectively removing portions of said covering sheet from upper portions of said workpiece to expose said upper portions for machining and to maintain a seal of said planar surface from the ambient pressure, the remaining portions of said covering sheet being drawn into ever closer contact with the edges of said workpiece by said vacuum.

References Cited by the Examiner

UNITED STATES PATENTS

| 1,062,579 | 5/1913 | Aylsworth | 248—363 X |
| 1,198,402 | 9/1916 | Bagnall | 51—235 |
| 2,443,987 | 6/1948 | Morrison et al. | 269—21 |
| 2,989,827 | 8/1956 | Groth | 53—22 |
| 3,180,608 | 4/1965 | Fisher | 248—363 |

FOREIGN PATENTS

| 12,101 | 1848 | Great Britain. |
| 751,253 | 6/1956 | Great Britain. |

ROBERT C. RIORDON, *Primary Examiner*.
B. S. MOWRY, *Assistant Examiner*.